US008800775B2

(12) United States Patent
Thomas et al.

(10) Patent No.: US 8,800,775 B2
(45) Date of Patent: Aug. 12, 2014

(54) METHOD FOR RECOVERING METALS FROM ELECTRONIC WASTE CONTAINING PLASTICS MATERIALS

(75) Inventors: Christian Thomas, Paris (FR); Joël Menuet, Billy-Montigny (FR); Gervais Vanhelle, Oignies (FR)

(73) Assignee: Terra Nova, Isbergues (FR)

( * ) Notice: Subject to any disclaimer, the term of this patent is extended or adjusted under 35 U.S.C. 154(b) by 169 days.

(21) Appl. No.: 13/129,150

(22) PCT Filed: Nov. 13, 2009

(86) PCT No.: PCT/IB2009/055059
§ 371 (c)(1),
(2), (4) Date: May 13, 2011

(87) PCT Pub. No.: WO2010/055489
PCT Pub. Date: May 20, 2010

(65) Prior Publication Data
US 2011/0220554 A1    Sep. 15, 2011

(30) Foreign Application Priority Data
Nov. 14, 2008    (FR) ...................................... 08 06357

(51) Int. Cl.
*B03D 3/00*    (2006.01)
(52) U.S. Cl.
USPC .......... 209/3.1; 209/12.1; 209/38; 209/127.1; 209/214; 209/215
(58) Field of Classification Search
USPC ................. 209/3.1, 12.1, 38, 127.2, 214, 215
See application file for complete search history.

(56) References Cited

U.S. PATENT DOCUMENTS

| | | | | |
|---|---|---|---|---|
| 3,666,185 | A | * | 5/1972 | Williams ......................... 241/17 |
| 4,586,659 | A | * | 5/1986 | Easter, II ......................... 241/23 |
| 5,133,507 | A | * | 7/1992 | Sepling et al. .................. 241/78 |
| 5,301,881 | A | * | 4/1994 | Hayashi et al. ................. 241/65 |
| 5,649,785 | A | * | 7/1997 | Djerf et al. ............... 405/129.27 |
| 2004/0035756 | A1 | * | 2/2004 | Mankosa et al. .................. 209/8 |
| 2012/0048975 | A1 | * | 3/2012 | Gitschel ..................... 241/24.13 |

FOREIGN PATENT DOCUMENTS

| | | |
|---|---|---|
| CN | 1402376 | 3/2003 |
| EP | 0403695 | 12/1990 |
| EP | 0682099 | 11/1995 |
| FR | 2247287 | 5/1975 |
| FR | 2690928 | 11/1993 |
| JP | 08238472 | 9/1996 |
| JP | 2001046975 | 2/2001 |
| WO | 2005084839 | 9/2005 |
| WO | WO 2005084839 A1 * 9/2005 ............... B09B 3/00 |

* cited by examiner

*Primary Examiner* — Terrell Matthews
(74) *Attorney, Agent, or Firm* — Peter A. Nieves; Sheehan Phinney Bass + Green PA

(57) ABSTRACT

The invention relates to a method for treating materials containing a mixture of plastic materials and metal materials, said method including: —crushing the material to be treated; pyrolysis of the crushed material; a first magnetic separation performed on the pyrolysed material providing, on the one hand, a ferrous metal fraction and, on the other hand, non-ferrous residue; —a second magnetic separation performed on the non-ferrous residue providing, on the one hand, a non-ferrous metal fraction and, on the other hand, non-magnetic residue. The invention also relates to a facility for implementing said method.

15 Claims, 1 Drawing Sheet

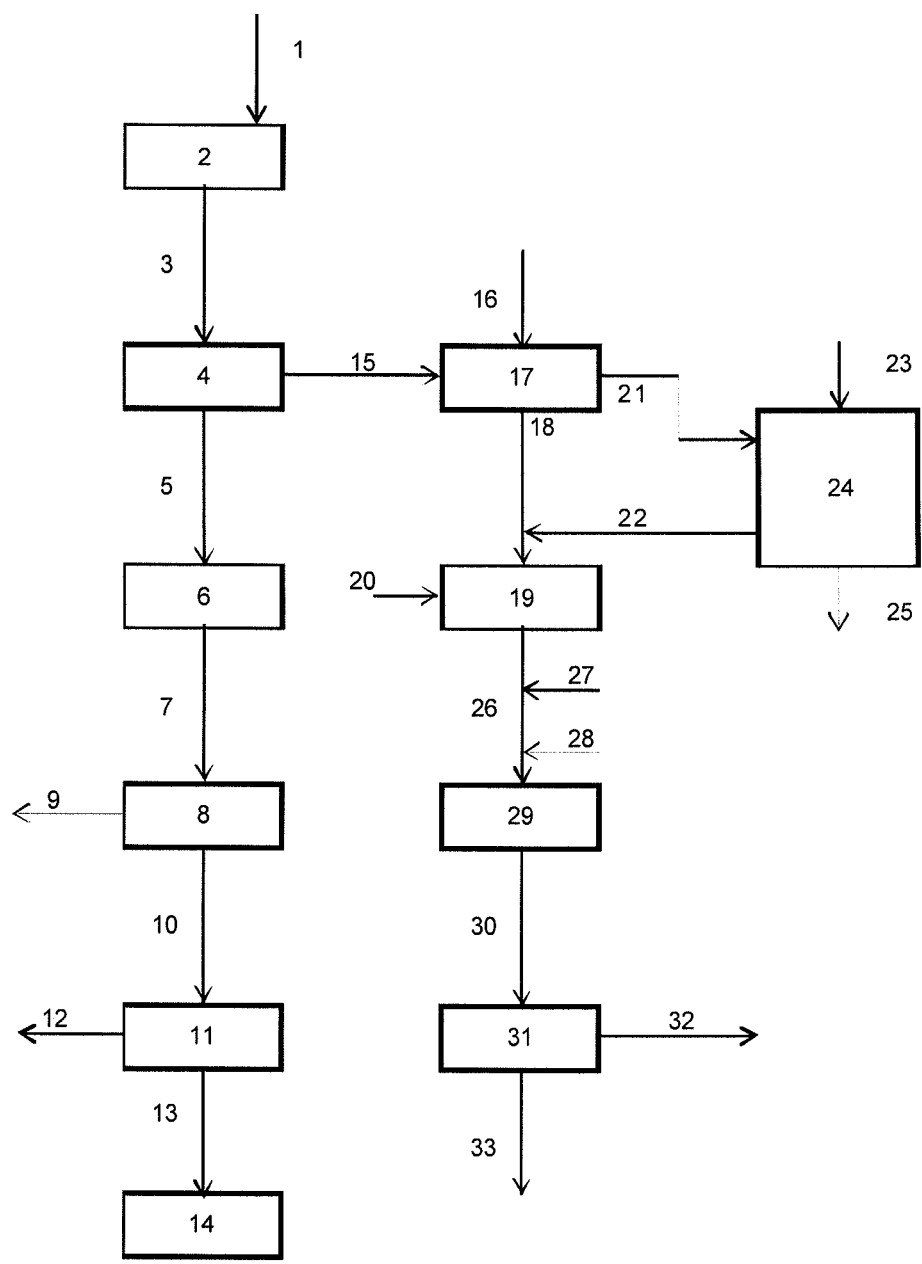

METHOD FOR RECOVERING METALS FROM ELECTRONIC WASTE CONTAINING PLASTICS MATERIALS

FIELD OF THE INVENTION

The present invention relates to a method for recovering metals from electronic waste, notably used electronic circuit boards, and a plant suitable for the implementation of this method.

BACKGROUND TO THE INVENTION

The increased use of computers, mobile phones, electronic equipment and other short life high-tech devices creates a growing amount of waste typically containing ferrous metals, copper, aluminum, zinc, rare and precious metals. This situation poses the problem of recovering and processing of metals contained in the waste. Thus, such waste constitutes a veritable source of metals.

A known technique for recovery of metals is to load the waste (previously shredded to about 4 cm) in primary ovens or copper furnaces. This technique produces high emissions of dust, sulfur dioxide and gases containing halogens (chlorine and bromine). The gases thus require further complex processing. Another problem with this technique is that electronic waste generates a lot of heat during combustion of the plastic they contain. In other words, the high calorific value of electronic waste is an obstacle to this technique. The frequently high aluminum content in the treated waste is another problem, since the presence of aluminum in the slag or cinders increases their melting point so that treatment becomes very difficult. Because of these various drawbacks, primary oven capacity to handle electronic waste is limited.

Other recovery techniques use methods of fine shredding followed by magnetic and electrostatic separation to enrich and sort phases rich and poor in metals. For example, International application WO 2007/099204 describes a method comprising shredding the waste into particles of 2-4 mm, electrostatic charging of the materials by friction against a drum, followed by electron bombardment, and finally sorting of the materials using an electric field. However, such techniques are expensive (especially in view of the fine shredding that is necessary), only provide imperfect sorting and thus lead to poor performance of precious metal recovery.

In another approach, European patent EP 1,712,301 describes a method for processing electronic waste in which metal wire fragments are recovered from waste through a barrel provided with a textile strip to which the wire fragments adhere.

Attempts have also been eight to recover metals by fluidized bed pyrolysis. However, this technique has the disadvantage of mixing the metal with an additive (fluidizing medium) such as sand, quartz and the like, complicating recovery. Indeed, screening, which is carried out downstream from the pyrolysis, cannot effectively separate the additive from certain metallic dusts. Furthermore, such a method consumes more energy, a part of the metals gets oxidized and metals are entrained in the gas phase.

There is therefore a real need to develop a method for recovering the metals contained in electronic waste, which overcomes the disadvantages mentioned above. In particular, it is desirable to develop a simple the that consumes relatively little energy, does not require extensive treatment of the gases emitted, and makes it possible to obtain a good yield of recycled metals.

SUMMARY OF THE INVENTION

The invention firstly provides a method for treating materials containing a mixture of plastic and metal materials, said method comprising:
  shredding the materials to be processed;
  pyrolysis of the shredded material;
  a first magnetic separation performed on the pyrolyzed materials, providing a ferrous metal fraction and, secondly, non-ferrous residues;
  a second magnetic separation performed on the non-ferrous residues, providing, on the one hand, a non-ferrous metal fraction and, on the other hand, non-magnetic residues containing precious metals.

According to one embodiment, the material is electronic waste, preferably used electronic circuit boards.

According to one embodiment, the shredding is performed down to a screen passage size Dmax not exceeding 50 mm, preferably between 20 and 30 mm.

According to one embodiment, the pyrolysis is performed at a temperature between 300 and 600° C. and/or with an air factor between 0.7 and 0.98.

According to one embodiment, the first magnetic separation is effected by a magnet or electromagnet.

According to one embodiment, the second magnetic separation is performed using an eddy current separator.

According to one embodiment, the method further comprises a step of combustion of the gases from pyrolysis, optionally followed by a step of neutralizing the gas with sodium bicarbonate.

The precious metals can include gold, silver, platinum, palladium, rhodium, ruthenium, iridium and/or osmium.

According to one embodiment:
  the ferrous metal fraction comprises iron and/or derivatives of iron, and possibly gold and/or
  the non-ferrous metal fraction comprises aluminum and/or zinc.

The non-magnetic residues can include copper, lead, tin, glass fibers, carbon.

According to one embodiment of the method, the ferrous metal fraction is combined with non-magnetic residues after the second magnetic separation.

According to one embodiment, the method comprises a further stage of processing the non-magnetic residues to recover the copper content in the non-magnetic residue and/or recover precious metals contained in the non-magnetic residue in particular selected from gold, silver, lead, tin, platinum, palladium, rhodium, ruthenium, iridium and/or osmium.

The invention also provides a plant for treating material containing a mixture of plastic and metal materials, comprising successively:
  shredding means;
  a pyrolysis facility;
  a primary magnetic separator, and
  a secondary magnetic separator.

According to one embodiment, the shredding means are adapted to perform shredding down to a screen passage size Dmax not exceeding 50 mm, preferably between 20 and 30 mm.

According to one embodiment of the plant, the primary magnetic separator comprises a magnet or electromagnet placed above a conveyor belt.

According to one embodiment of the plant, the secondary magnetic separator comprises a separator using eddy currents.

According to one embodiment of the plant, it further comprises a line for collecting pyrolysis gases supplying a combustion chamber, and optionally, at the exit from the combustion chamber, a contact chamber fed by a supply of activated carbon and a supply of sodium bicarbonate.

The present invention overcomes the disadvantages of the prior art. It specifically provides a simple and energy-efficient process, giving a good yield of recycled metals.

This is accomplished through the surprising finding that the direct pyrolysis of materials that have previously been coarsely ground or shredded (fine shredding being unnecessary) makes it possible to directly obtain a mixture of the various constituents in a separated form: notably carbon-containing residues on the one hand and the various other metals on the other hand.

According to certain particular embodiments, the invention also has one or more of the advantageous features listed below.

The method of the invention makes it possible to eliminate epoxy resins and plastic components of electronic circuit boards as well as chlorine and a major portion of bromine while avoiding metal loss by oxidation or distillation in view of the low temperature and non-oxidizing conditions of the operation. The material is thus concentrated in metals.

The method of the invention makes it possible, during the cooling of combustion gases from gases produced during pyrolysis, to recover, under favorable conditions, the energy contained in these gases.

The material thus pyrolyzed can advantageously be treated in conventional tools of copper metallurgy thereby overcoming certain technological limitations of these tools and more specifically volatile matter content (carbon chains) and halogens.

In the case of electronic card processing, the decomposition of epoxy resins during pyrolysis has the effect of freeing all the components rendered integral with the base material: copper, electronic components, metal components, and so on. This separation from the base material allows a very efficient use of magnetic sorting (being more effective than separation performed by shredding very finely).

The method of the invention maximizes the efficiency of metal recovery, other words minimizes losses of metal during the process.

The method of the invention makes it possible to separate aluminum from other metals during the process, so as to facilitate downstream processing of the metals recovered. In the case of pyro-metallurgical processes, aluminum does indeed have a behavior detrimental to the fluidity of slag. In the case of hydrometallurgical processes, aluminum because of its chemical reactivity leads to overconsumption of chemicals.

Treatment of gases from the pyrolysis (including post-combustion) makes it possible to render the method clean without requiring any heavy manipulation of halogens, sulfur compounds or heavy metal emissions.

BRIEF DESCRIPTION OF THE DRAWINGS

FIG. 1 shows schematically an example of plant for electronic waste processing according to the invention.

DESCRIPTION OF EMBODIMENTS OF THE INVENTION

The invention will now be described in more detail and in a non-limiting fashion in the following description.

Plant for Treating for Electronic Waste

Referring to FIG. 1, a plant for treating for electronic waste according to the invention comprises the following elements, shown schematically.

Input of the plant for treating is provided by a supply line for electronic waste in bulk 1. This supply line 1 for electronic waste supplies shredding and sampling means 2. The shredding and sampling means may include a primary crusher to reduce the size of the waste to less than 50 mm, a primary sampler to collect a primary sample representative of total inflow (e.g. 10% of total inflow) a second mill to grind the primary sample to a size of 10 mm, a secondary sampler representative of the primary sample (e.g. 10% of the flow of the primary sample), optionally a third crusher and a tertiary sampler.

A preferred example of the primary crusher is a knife mill equipped with a 25 mm grid. This type of grinder has the advantage of limiting the production of fines.

At the exit from the shredding and sampling means 2, a shredded waste supply line 3 supplies shredded waste to a pyrolysis facility 4. A buffer silo (not shown) may be provided between the shredding and sampling means 2 and the pyrolysis facility 4. The pyrolysis facility 4 may in particular be a screw conveyor furnace, a reverberatory furnace, a rotary furnace, a fluidized bed furnace, a multistage furnace and the like.

Preferably, the pyrolysis facility is a multistage furnace, for example of about 100 m$^2$, directly gas heated. The facility can typically have a power of around 1000 kW.

At the exit from the pyrolysis facility 4, there are provided a flow line 5 for conveying pyrolyzed residues and a conduit for collecting pyrolysis gases 15.

The flow line 5 for conveying pyrolyzed residues supplies cooling means 6. The cooling means 6 can notably include a heat exchanger. A jacketed screw of about 50 m$^2$ surface area and cooled by water may be particularly suitable.

At the outlet of cooling means 6, a supply line 7 for cooled residues feeds a primary magnetic separator 8. The primary magnetic separator 8 may be a simple electromagnet placed above a conveyor belt.

A recovery line for the ferrous metal fraction 9 and a recovery line for non-ferrous residues 10 are connected at the exit from primary magnetic separator 8.

The recovery line for non-ferrous residues 10 in turn feeds a secondary magnetic separator 11, specially designed for this function. The secondary magnetic separator 11 can for example make use of eddy currents.

A recovery line for the non-ferrous metal fraction 12 and a recovery line for non-magnetic residues 13 are connected at the exit from the secondary magnetic separator 11. The recovery line for non-magnetic residues 13 in turn feeds conditioning means 14.

In one particular embodiment, the conduit for collecting pyrolysis gas 15 feeds a combustion chamber 17, which is also supplied by an air inlet pipe 16. The combustion chamber 17 may be of a cylindrical metal chamber type protected by one or more layers of bricks.

At the exit from the combustion chamber 17, a combustion products collection line 18 feeds cooling means 19. The cooling means 19 may for example consist of a cooling tower 19, operating by injection of a water spray 20, or a flue gas heat exchanger (air/flue gas or water-flue gas) and cooler.

A flow line for collecting cooled combustion products 26 is connected to the outlet of the cooling means 19 and supplies a contact chamber 29. An addition of activated carbon 27 and an addition of sodium bicarbonate 28 are also provided at the inlet to the contact chamber 29. The contact chamber 29 can be of the cylindrical type having sufficient volume to provide a residence time of combustion products of about two seconds.

At the outlet from the contact chamber 29, a collection line for treated products 30 feeds a filter 31 at the outlet from which there are provided a recovery line 33 for purified gas and a flow line for halogen recovery 32. The filter 31 may be of the bag filter or electro-filter type.

In one possible embodiment, a preliminary cooling system can be provided upstream of the cooling means 19. This cooling system includes a preliminary sampling line 21 at the outlet from combustor chamber 17 which feeds a heat exchanger 24, then joining the line for collecting combustion products 18. The heat exchanger 24 is also fed by a supply of heat transfer flue 23. Exit 25 of the heat transfer fluid provides for energy recovery.

Method of Processing Electronic Waste

We describe below an example of a method for processing electronic waste making it possible to put the metals they contain to further use.

By "electronic waste" we mean used materials that include electronic components. Electronic waste may include individual electronic components, mobile phones and other small devices containing circuit boards. Preferably, the electronic waste comprises or consists of electronic circuit boards, that is to say, consists of printed circuit boards on which electronic components are soldered. The remainder of the process is described in connection with the recycling of electronic circuit boards.

The method is however also applicable to the case of other types of starting materials, i.e. in general materials (preferably used materials or waste) that include a certain percentage or metal (notably including a fraction of metal containing precious metals) and a plastic fraction. The plastic fraction may include notably epoxy resins, polyethylene or polyvinyl chloride. The metal fraction for its part may include, notably, ferrous metals, copper, lead, aluminum, zinc, precious metals (gold, silver, platinum, palladium, rhodium, ruthenium, iridium, osmium). For example, the method can be applied to automotive shredder residue.

The method described here includes five main steps:
(1) shredding;
(2) pyrolysis;
(3) cooling;
(4) magnetic sorting, and
(5) gas treatment.

This example corresponds to the operation of the plant for treating described above in connection with FIG. 1.

The treatment capacity is of about 3 tons per hour.

In step (1), electronic circuit boards are crushed in the shredding means 2. Shredding is preferably done down to a size Dmax of 25 mm (Dmax is defined as the screen passage size). The shredded up circuit boards are then stored in a buffer silo.

The buffer silo feeds at a rate of about 3 tons per hour the pyrolysis facility 4, wherein the pyrolysis is performed at step (2). For this step (2), the shredded up circuit boards are heated up in the furnace to a temperature of between 300 and 450° C., preferably about 400° C. in a suitable reactor, essentially in the absence of oxygen (under reducing or neutral conditions). More specifically, the burners are adjusted to be poor in air and the air factor (ratio between combustion air and the theoretical air for neutral combustion) is between 0.7 and 0.9. The duration of pyrolysis is adjusted to obtain complete decomposition of the carbon chains that make up the plastic fraction (notably the epoxy resin chains). For example, the duration can be between 10 and 30 minutes. An addition of about 1 ton of steam per hour at the floor of the multistage furnace makes it possible to control the temperature thereof.

During step (3), pyrolysed residues pass through the cooling means 6. This step makes it possible to reduce the temperature of the pyrolysed residues down to a temperature of between 60 and 100° C.

Then, step (4) includes the actual separation of metals. This step makes it possible to enrich the solid residues in precious metals and to reduce the concentration in components harmful to the subsequent treatment of the pyrolyzed residues (notably aluminum).

In a first step, the cooled residues passes through the primary magnetic separator 8, typically a simple electromagnet placed above a conveyor belt. Thereby, extraction of the ferrous metal fraction residues is achieved. This ferrous metal fraction comprises mainly iron and iron compounds, but eventually, depending on the origin of the electronic circuit boards, the ferrous metal fraction may also include (be mixed with) gold. This is particularly the case when electronic circuit boards are gold flashed. Preferably, the ferrous metal fraction comprises not more than 1% aluminum.

In a second step, the residues free of their ferrous metal fraction undergo a magnetic extraction of non-ferrous, at a secondary magnetic separator 11, typically using eddy currents. Thus, a non-ferrous metal fraction, which includes notably aluminum and zinc is extracted. The aluminum can be recovered and sold for recycling. On the other hand, the remaining residues (nonmagnetic residues) are recovered via the recovery line for non-magnetic residues 13. Preferably, the non-magnetic residues does not comprise more than 2% aluminum.

To perform the magnetic extraction of non-ferrous using eddy currents, it is important that the non-ferrous metal fraction (including aluminum) be essentially in non-oxidized form. Therefore, the method is implemented so that the metals making up the non-ferrous metal fraction, and primarily aluminum, are not oxidized before the magnetic extraction step for non-ferrous metals. Typically, when heated by direct flame, flame adjustment is set to be deficient in oxygen (typically 90% of the stoichiometric amount); in case of indirect heating, the atmosphere must be reducing. Furthermore, it is preferable to work below the melting point of aluminum, to avoid traces of oxygen oxidizing the molten metal (easier to oxidize than solid metal).

Depending on the precious metal content of the ferrous metal fraction, it is possible either to separately prepare the fraction of metallic iron for further use or to once again makes it with the residual non-magnetic fraction after the second magnetic separation (at the recovery line for non-magnetic residues 13).

Preparing the ferrous metal fraction for reuse may include recovery of precious metals it contains, for example by the following methods: recycling the magnetic part rich in precious metals at the input to the copper furnaces, and processing of anode slimes from electro-refining of copper anodes running out at the exit from the furnace; washing the magnetic portion with a wash including lead in order to solubilize the precious metals in the lead, and processing the lead by any conventional method for recovering the precious metals (such as zinc plating, distillation and cupellation, or treatment of a Betts electrorefining type).

Non-magnetic residues include notably carbon, glass fibers, copper, lead, tin and precious metals generally. The precious metals in question may include gold, silver, platinum, palladium, rhodium, ruthenium, iridium and/or osmium. These non-magnetic residues are then packed in so-called big bags or in bulk to be treated either by hydrometallurgical or pyrometallurgical processes.

Hydrometallurgy may include a step of attack by sulfuric acid in an oxidizing environment, followed by electrowinning to recover the copper, the residues of attack being reduced in a rotary furnace containing lead in order to solubilize the precious metals, the tin and the lead. The lead and tin can be refined by Betts type electrolysis, the sludge containing essentially precious metals.

Regarding the pyrometallurgical treatment, the residues are recycled to the entry to the copper furnaces, after which the anode sludge from the electro-refining of copper anodes running at the furnace exit are treated.

As for step (5), it can be performed concurrently with step (2), since it concerns the treatment of gases produced by pyrolysis.

Gases from pyrolysis contain combustion products from burners, water vapor and gases from the decomposition of epoxy resins and other carbon chain materials.

These gases are burned in the combustion chamber 17 to a temperature sufficient to allow the destruction of dioxins. A temperature between about 850 and about 1100° C. may be appropriate. Hydrochloric acid and hydrobromic acid are thus produced.

After cooling the gas to a temperature between about 180 and about 200° C. (at cooling means 19), an injection of activated carbon (e.g., about 50 mg/m$^3$) and sodium bicarbonate (typically about 20 kg/h) is performed in order to fix the remainder of the dioxins and to cause the HCl and HBr to react with the sodium bicarbonate to form sodium bromide and sodium chloride. The reactions take place in the contact chamber 29, with a contact time of about 2 seconds.

After filtration, essentially a mixture of sodium bromide and sodium chloride is recovered, the mixture can be further processed for recovery of bromine.

It is also possible to arrange to extract energy from the combustion products (heat exchange at heat exchanger 24), this energy being then able to be recycled to other steps of the process.

Note that step (5) can be advantageously replaced by a step of condensation of the gas phase for recovery and recycling of products from the decomposition of carbon chains (phenol, bisphenol, bromophenol and other components).

EXAMPLE

This example below illustrates the invention without limiting it.

It implements the method described above for treating used electronic circuit boards. It reintroduces the ferrous metal fraction after the second magnetic separation. The table below provides an estimate of changes in the chemical composition of the products at different stages of the process.

|  | Raw waste | After pyrolysis | After double magnetic separation |
| --- | --- | --- | --- |
| Cu (%) | 17 | 23 | 24.5 |
| Al (%) | 6.5 | 8.8 | 2.8 |
| Fe (%) | 5 | 6.7 | 7.14 |
| Precious metals (g/t) | 1000 | 1350 | 1440 |
| Carbon chains (%) | 34 | 0 | 0 |
| Carbon (%) | 0 | 11.1 | 11.8 |
| Cl (%) | 0.4 | 0.0 | 0.0 |
| Br (%) | 0.6 | 0.3 | 0.0 |
| SiO$_2$ (%) | 22 | 29.7 | 31.6 |

The invention claimed is:

1. A method for treating materials containing a mixture of plastic and metal materials, said method comprising:
    shredding the materials to be processed;
    performing pyrolysis of the shredded material;
    a first magnetic separation performed on the pyrolyzed materials, providing a ferrous metal fraction and, secondly, non-ferrous residues;
    a second magnetic separation performed on the non-ferrous residues, providing, on the one hand, a non-ferrous metal fraction and, on the other hand, non-magnetic residues containing precious metals, and
    a step of combustion of the gasses from pyrolysis,
    wherein the step of combustion of the gases from pyrolysis is followed by a step of neutralizing the gas with sodium bicarbonate.

2. The method according to claim 1, wherein the material is electronic waste, preferably used electronic circuit boards.

3. The method according to one of claim 1 or 2, wherein the shredding is performed down to a screen passage size $D_{max}$ not exceeding 50 mm, preferably between 20 and 30 mm.

4. The method according to one of claims 1-3, wherein the pyrolysis is performed at a temperature between 300 and 600° C. and/or with an air factor between 0.7 and 0.98.

5. The method according to one of claims 1-4, wherein the first magnetic separation is effected by a magnet or electromagnet.

6. The method according to one of claims 1-5, wherein the second magnetic separation is performed using an eddy current separator.

7. The method according to one of claims 1-6, wherein the precious metals contained in the non-magnetic residues include gold, silver, platinum, palladium, rhodium, ruthenium, iridium and/or osmium.

8. The method according to one of claim 1-6 or 7, wherein:
    the ferrous metal fraction comprises iron and/or derivatives of iron, and possibly gold and/or
    the non-ferrous metal fraction comprises aluminum and/or zinc.

9. The method according to one of claim 1-6 or 7-8, wherein the non-magnetic residues include copper, lead, tin, glass fibers, carbon.

10. The method according to one of claim 1-6 or 7-9, wherein the ferrous metal fraction is combined with non-magnetic residues after the second magnetic separation.

11. The method according to one of claim 1-6 or 7-10, comprising a further stage of processing the non-magnetic residues to recover the copper content in the non-magnetic residue and/or recover precious metals contained in the non-magnetic residue in particular selected from gold, silver, lead, tin, platinum, palladium, rhodium, ruthenium, iridium and/or osmium.

12. A plant for treating a material containing a mixture of plastic and metal materials, comprising successively:
- shredding means;
- a pyrolysis facility;
- a flow line for collecting pyrolysis gasses supplying a combustion chamber;
- at the exit from the combustion chamber, a contact chamber fed by a supply of activated carbon and a supply of sodium bicarbonate;
- a primary magnetic separator; and
- a secondary magnetic separator.

13. The plant according to claim 12, wherein the shredding means are adapted to perform shredding down to a screen passage size $D_{max}$ not exceeding 50 mm, preferably between 20 and 30 mm.

14. The plant according to one of claim 12 or 13, wherein the primary magnetic separator comprises a magnet or electromagnet placed above a conveyor belt.

15. The plant according to one of claims 12 to 14, wherein the secondary magnetic separator comprises a separator using eddy currents.

* * * * *